Patented June 3, 1941

2,244,654

UNITED STATES PATENT OFFICE 2,244,654

RUBBER RECLAIMING

Fritz Rostler and Vilma Mehner, Vienna, Germany

No Drawing. Application March 23, 1939, Serial No. 263,810. In the Netherlands, Poland, and Danzig October 2, 1936

4 Claims. (Cl. 260—712)

This invention relates to rubber reclaiming; and it comprises an improved method of treating scrap rubber, including vulcanized rubber, to obtain a plastic product which is vulcanizable with added sulfur, wherein the scrap rubber is heated with certain rubber-miscible unsaturated hydrocarbons reactive with sulfur and obtainable from waste products of mineral oil refining, the heating being advantageously in the presence of alkalies; and it comprises the new rubber compound obtained by treatment of scrap rubber with the said rubber-miscible hydrocarbons, and containing substantial amounts of said hydrocarbons, and having novel characteristics; all as more fully hereinafter set forth and as claimed.

It has been previously proposed to employ mineral oils and certain other petroleum products as softeners and plasticizers for reclaimed or regenerated rubber. These materials are not reactive with sulfur, and can be used only in very small percentages, generally as substitutes for tar, tar oil, etc. On the other hand, the hydrocarbons employed in the present invention are reactive with sulfur, and are most advantageously applied in relatively large amounts. It is sometimes advantageous to prepare final products containing more of these hydrocarbons than of the reclaimed rubber itself.

This invention was made possible by our discovery that, by appropriate treatment of waste products produced in the refining of mineral oils, novel materials may be produced consisting essentially of viscous unsaturated hydrocarbons and having many applications in the arts and industries. As a starting material for the production of these essentially hydrocarbon products, the acid sludges produced in the sulfuric acid method of refining uncracked petroleum fractions heavier than kerosene are especially desirable. For example, the acid sludge produced in refining lubricating oil with sulfuric acid is well adapted for our purposes.

An acid sludge resulting from the employment of sulfuric acid in refining oil contains the elements of sulfuric acid in organic combination; as sulfonic acids and other complex acids, etc. Such a sludge may be worked up in various ways to obtain material of the character here described, the operation being such as to split off the combined acid, usually as an ordinary sulfate. For example, the sludge may be mixed with a neutralizing agent capable of binding sulfuric acid or other acids present, and heated to effect pyrolytic decomposition of the sludge into an organic reaction product and an inorganic reaction product, which is largely calcium sulfate when lime is used. The organic reaction product consists principally of the hydrocarbons here utilized, and is separated from the inorganic product as by distillation, advantageously under vacuum or other conditions promoting low partial pressure and minimizing undesired reactions. If desired, the organic reaction product may be separated from the inorganic product by extraction with a suitable solvent, the extract then being distilled to recover the desired fractions. This method of preparation is described in more detail and claimed in our copending applications, Serial Nos. 751,891, 138,666 and 220,584 (Patent No. 2,185,952).

Another method of preparing the desired hydrocarbon materials consists essentially in splitting the acid sludge by boiling it with a suitable dispersion (a solution or suspension) of neutralizing agents, separating the organic reaction product, and distilling it under suitable conditions, using vacuum for example. This method is described and claimed in our application, Serial No. 149,183, filed June 19, 1937 (Patent No. 2,185,951). In both methods, it is generally advantageous to distil the organic product under a vacuum of 3 to 40 mm. mercury, recovering the fraction distilling between 160° and 380° C. at this vacuum.

A further method of preparing like hydrocarbons or rubber-miscible oils suitable for our purpose is described in our application Serial No. 224,626 (Patent No. 2,217,918). In this method, the starting material is the residue of the selective solvent method of refining mineral oil fractions. As is well known, any of numerous selective solvents may be employed, including furfural, phenols, liquid $SO_2$, mixtures of $SO_2$ and benzol, nitrobenzene, etc. The material separated from the main body of oil by the solvent is treated, as by distilling and neutralizing, to eliminate the solvent and fractions boiling outside of the desired range, and the desired rubber-miscible oils are recovered.

The oily hydrocarbon products obtained by these processes are generally reddish brown, greenly fluorescent oils of high viscosity, or more or less liquid resins. Chemical analysis shows that they are essentially unsaturated hydrocarbons substantially free from sulfur, oxygen and other groups exerting undesirable influence in rubber mixtures, such as $SO_3H$, $NH$, $SH$, etc. The composition of these products is approximately 90 per cent carbon and 10 per cent hydrogen, indicating a probable formula of $(C_3H_4)_x$.

The molecular weight of the recovered products is quite high, being generally from 300 to 1000, and averaging about 400 to 600. Because of the high molecular weight, these unsaturated hydrocarbons have relatively low iodine numbers, generally about 20, but sometimes less than 20 and sometimes as high as 60. The indicated iodine number depends on the methods employed in manufacturing and in testing the product. For example, it is sometimes very difficult to determine whether iodine is substituted or added or both, during the test; but the "real" iodine number depends on addition only.

Our new hydrocarbon products are distinguishable from ordinary petroleum or mineral oil hydrocarbons in several respects. They are completely soluble in concentrated sulfuric acid, and they are also soluble in aniline and acetone. Their boiling points are much higher than those of the corresponding refined products from which they were derived as acid sludge or solvent extract. As noted, they usual distil between about 150° and 380° C. in a vacuum of 12 mm. mercury. The viscosity of these products is also considerably higher than that of the corresponding refined mineral oils—for example, 100 to 200 times higher at ordinary temperatures. These new products are not particularly reactive with dilute reagents, but they react readily with concentrated reagents. For example, they yield linkage products when treated with concentrated acids. Nitric acid produces solid nitro products, and sulfuric acid produces compounds similar to acid sludge. It has been impossible to hydrogenate these compounds under the conditions and with the catalysts usually effective with mineral oils. They have a great affinity for sulfur, and when heated with small quantities of sulfur (such as 4 per cent) they form derivatives or polymerization products of more highly viscous character.

From the composition and sulfur reactivity of our new hydrocarbons, it appears that they are chemically closely related to rubber $(C_5H_8)_x$; and they are useful in connection with it. They have found many uses in the rubber industry, in various rubber mixtures. They undergo co-vulcanization with rubber and sulfur to form products which are often superior to rubber compositions produced without these hydrocarbon additions. Many applications of these hydrocarbons in the rubber industry are described in more detail and are claimed in our application, Serial No. 166,392, filed Sept. 29, 1937 (now Patent No. 2,180,367) of which the present application is a continuation-in-part. Due to the good vulcanizing properties of our new hydrocarbons and to their affinity for rubber, they may be worked into rubber mixtures in large quantities. Unlike the various rubber surrogates, factis, etc., they are not mere diluents. The addition has a marked softening effect on rubber mixtures, but this softening may be controlled by appropriate adjustments of the amount of sulfur employed. Quantities of these hydrocarbons up to 100 per cent and more on the rubber have been employed in rubber mixtures, with good results.

The present application relates primarily to the employment of our new hydrocarbons in treatments akin to the reclaiming, regenerating, "devulcanizing", and similar operations heretofore applied to waste rubber. These hydrocarbons are excellent swelling and dissolving agents for rubber, and since their capacity for combining with sulfur in the presence of rubber is greater than that of rubber itself, they constitute a valuable regenerating material. By proper application of these materials, it is possible to regenerate or plasticize vulcanized rubber goods to a greater extent than has hitherto been feasible, making new materials which are readily vulcanized. This is due to the fact that the free sulfur in the waste rubber is combined by the addition of these hydrocarbons, and also that by "alloying" the rubber with the hydrocarbons, the capacity of the mixture for taking up further quantities of sulfur is increased. In working up waste rubber in accordance with the present invention, the fillers and fibers present are generally removed, but they may be allowed to remain, in whole or in part.

Our hydrocarbons may be employed with good results in various methods of regenerating. For example, they may be added to the mixture during the known process of reclaiming with caustic soda or other alkalies, or the rubber may be treated with these hydrocarbons and superheated steam in the absence of alkalies, or the scrap rubber may be cut up and heated and kneaded with our hydrocarbons.

In one method of treating old rubber such as scrapped tire casings, for example, the rubber scrap is advantageously heated with about 10 to 15 per cent (on the rubber) of our new hydrocarbons, and about 12 per cent (on the rubber) of solid caustic soda, in the presence of sufficient water to cover the entire mixture. This mixture is heated with agitation in a suitable vessel for 8 to 24 hours, for example, the final stages of the heating being advantageously at a pressure of the order of 12 to 15 atmospheres. The aqueous lye is then drawn off and the regenerated rubber compound is washed and dried and then screened, advantageously by forcing it through a spray nozzle. Any fabric present is removed during this treatment. The reclaim or compound obtained is advantageously plasticized between rolls.

If the rubber stock to be reclaimed or regenerated is free from fabric, the method above described in connection with reclaiming the rubber in tire casings is applied, but lower concentrations of alkali are employed, and the heating may be at lower temperatures and for shorter periods. For example, from 2 to 4 per cent of caustic soda on the rubber may be employed with the stated 10 to 15 per cent of our hydrocarbons, and the heating need only be continued for 4 to 6 hours at a maximum temperature of steam at 2 to 6 atmospheres pressure.

In these and other regenerating operations, our new hydrocarbons need not be, and advantageously are not, removed after regeneration; as stated, they are closely allied to rubber, and are vulcanizable therewith. This is a distinct advantage over other known regenerating agents, which must be removed after the regenerating operation. This advantage is further utilized when high percentages (up to 30 per cent or more on the rubber) are employed. Since it is unnecessary to remove our reagents after regeneration, the operation is simpler than that usually employed. And since reagents are added to the rubber product the yield is greater. This increase constitutes an advance bulking or filling of the rubber mixtures in which the regenerate is subsequently used.

The regenerates or "reclaims" produced with the use of our new hydrocarbons are easily worked and may be converted into finished rubber goods, either alone or after admixture with further quantities of rubber, by vulcanization with additional sulfur. Another advantage of these new regenerates is that they do not tend to dry out and may, therefore, be stored for considerable lengths of time without appreciable deterioration. In other words, they "age" well. Most of the chemicals employed in the usual regenerating processes are active in their nature, and they must be completely removed if the regenerated rubber is to be stored, as is usually the case.

In another method of reclaiming rubber waste in accordance with the present invention, a batch of 100 parts of soft rubber scrap is mixed with 10 to 100 parts of our unsaturated hydrocarbon material, according to the desired hardness or frangibility of the final product. High frangibility or brittleness is desirable in making pulverulent final products. It should be noted in this connection that both the frangibility and the hardness of the final product increase as the proportion of our hydrocarbons in the mixture is increased, if suitable amounts of sulfur are added. This is directly opposite to the results obtained with previously known softeners. The batch of rubber and hydrocarbons (totaling 110 to 200 parts) is then mixed with about 30 to 50 parts of sulfur and the usual vulcanization accelerators. This mixture is then vulcanized in the usual manner to form hard rubber or vulcanite, and is then ground to vulcanite powder. This vulcanite powder is a very useful filler for rubber mixtures.

Another method is to ground the scrap rubber and heat it with a substantially equal quantity or slightly less of our new hydrocarbons to form a so-called "preparation."

As an illustration of the advantages resulting from the employment of our hydrocarbons in regenerating rubber, a test with tire casings will be described. These tire casings were treated with aqueous solutions containing 12 per cent of solid caustic soda on the rubber, and with and without the presence of 10 per cent of our unsaturated hydrocarbons. The heating in both cases was for 10 hours at 14 atmospheres absolute pressure. The regenerates thus obtained were vulcanized under identical conditions with identical quantities of sulfur and accelerator. The tensile strength of the vulcanized product regenerated with our hydrocarbons was 10 kgs. per sq. cm. greater, and its elongation was about 150 per cent greater, than the corresponding properties of the other product.

Even vulcanite may be regenerated by simply heating a mixture of vulcanite and the new hydrocarbons employed in accordance with our invention. Vulcanite or hard rubber may be regarded as completely vulcanized rubber containing an excess of sulfur. On treatment according to the present method, there is obtained a plastic rubber composition which is susceptible of vulcanization and has many uses in the rubber industry.

In a general way, the essential result of all methods of reclaiming and regenerating waste and scrap rubber is to obtain a plastic material capable of taking up sulfur and of being vulcanized. Using the method of the present invention, these results are most readily obtained. Our hydrocarbons are solvents and swelling agents for rubber, and they physically and chemically accelerate its regeneration, resulting in a substantial saving of time. The high sulfur-absorbing capacity of the hydrocarbons results in completely binding the free sulfur contained in the scrap rubber, and also makes the finished reclaim capable of vulcanization with additional sulfur. It is thus clear that our hydrocarbons have many advantages over the usual softening and plasticizing agents, such as wood-tar.

When reclaiming with our hydrocarbons and caustic alkali, it is most convenient to mix the hydrocarbons with a concentrated (e. g. 50 per cent) solution of the alkali, and to add the remainder of the water later, preferably in an agitator tank. The hydrocarbons should generally be employed in an amount from 5 to 25 per cent of the amount of rubber.

When reclaiming rubber by treatment with our hydrocarbon material without the presence of caustic alkalies, the waste rubber is soaked and allowed to swell in the presence of the hydrocarbons, and is then heated with steam to a pressure of about 200 pounds per square inch. Reclaim has been prepared in this manner, having tensile strengths of 850 pounds per square inch, and elongation of 400 per cent. These tests were made after vulcanizing the reclaim with sulfur and accelerator, but without other components. The yield of reclaim is very high in this procedure, and it is remarkable that the acetone-soluble constituent of the finished rubber goods is not increased by the presence of a large proportion of our hydrocarbons. From 15 to 20 per cent of our hydrocarbons, or more if desired, may be used in this process.

In a modification of the superheated-steam process and the alkali process, no agitator is employed. Instead, the scrap rubber is put in cups mounted on a car, which is wheeled into an autoclave. Before or after entering the autoclave, the rubber is sprayed with our hydrocarbons, alone or in admixture with alkali; and in the autoclave the system is heated to about 200 pounds per square inch for a suitable period, such as 8 hours. Good products are obtained in this way.

In addition to employing our hydrocarbons in various reclaiming treatments, they can also be worked into finished reclaim prepared in accordance with this invention or otherwise. It is more advantageous, however, to employ the hydrocarbons in the actual reclaiming treatment. When so employed, they not only result in a product having improved smell, aging properties, and other characteristics, but also increase the yield and simplify the operation, resulting in considerable saving of time.

In one way of looking at the present invention, instead of reclaiming waste rubber to produce rubber itself, the waste rubber is converted into a new and useful plastic; this plastic being in part composed of the waste rubber and in part the described hydrocarbon oils. All of the rubber, except perhaps some filler and fiber, is utilized and reappears in the new compound plastic, which has a high capacity for absorbing further quantities of sulfur in vulcanization.

What we claim is:

1. The method of treating waste rubber, which comprises heating the waste rubber with an aqueous solution of caustic alkali and a rubber-miscible oil derived from the waste products of petroleum refining, said oil comprising essentially viscous unsaturated hydrocarbons of high molecular weight having substantially the composition 90 per cent carbon and 10 per cent hydrogen, and being miscible with rubber in all proportions, soluble in sulfuric acid, reactive with sulfur, and capable of co-vulcanization with rubber and sulfur to produce high quality rubber goods.

2. The method of treating waste rubber, which comprises heating waste rubber with about 2 to 15 per cent of caustic soda in aqueous solution and with a rubber-miscible oil composed essentially of unsaturated hydrocarbons derived from the waste products of petroleum refining and characterized by miscibility with rubber in all proportions, high viscosity, high molecular weight, solubility in sulfuric acid, high reactivity with sulfur, and capability of co-vulcanization with sulfur and rubber to produce high quality rubber goods, and separating the aqueous solution from the plasticized, sulfur-reactive, plastic product.

3. The method of claim 2, wherein the said rubber-miscible oil is present in an amount from 5 to 25 per cent of the amount of rubber.

4. The method of claim 2, wherein the said plastic product is mixed with sulfur and a further quantity of rubber and vulcanized to produce finished rubber goods.

FRITZ ROSTLER.
VILMA MEHNER.